Inventors:
Gert Bechtloff
Reinhold Szonn

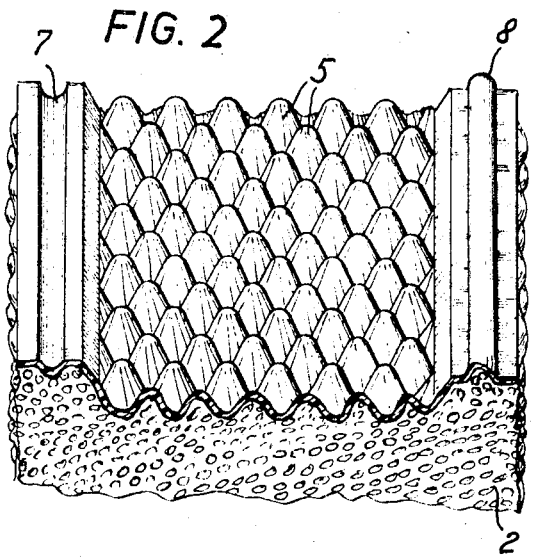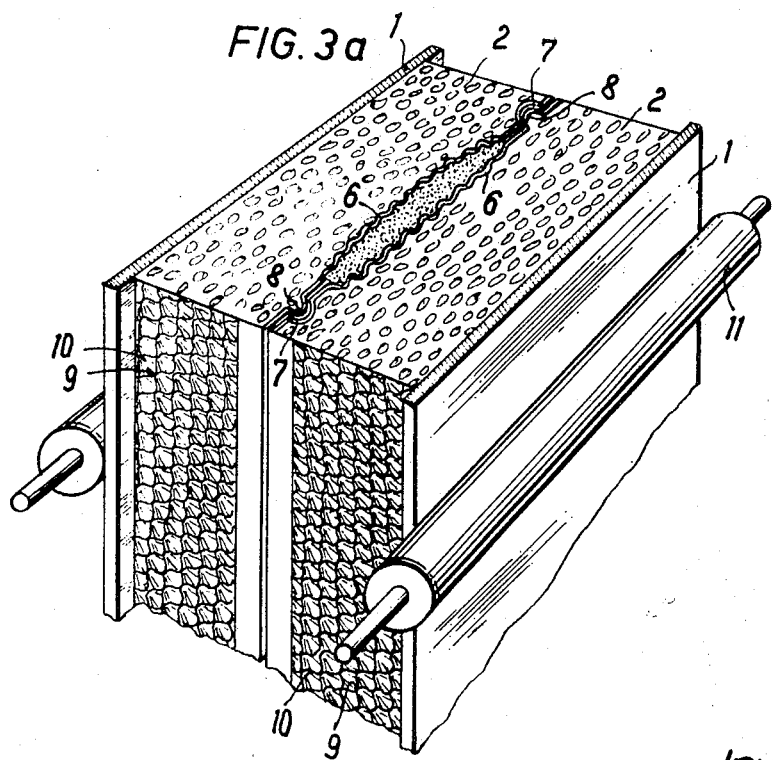

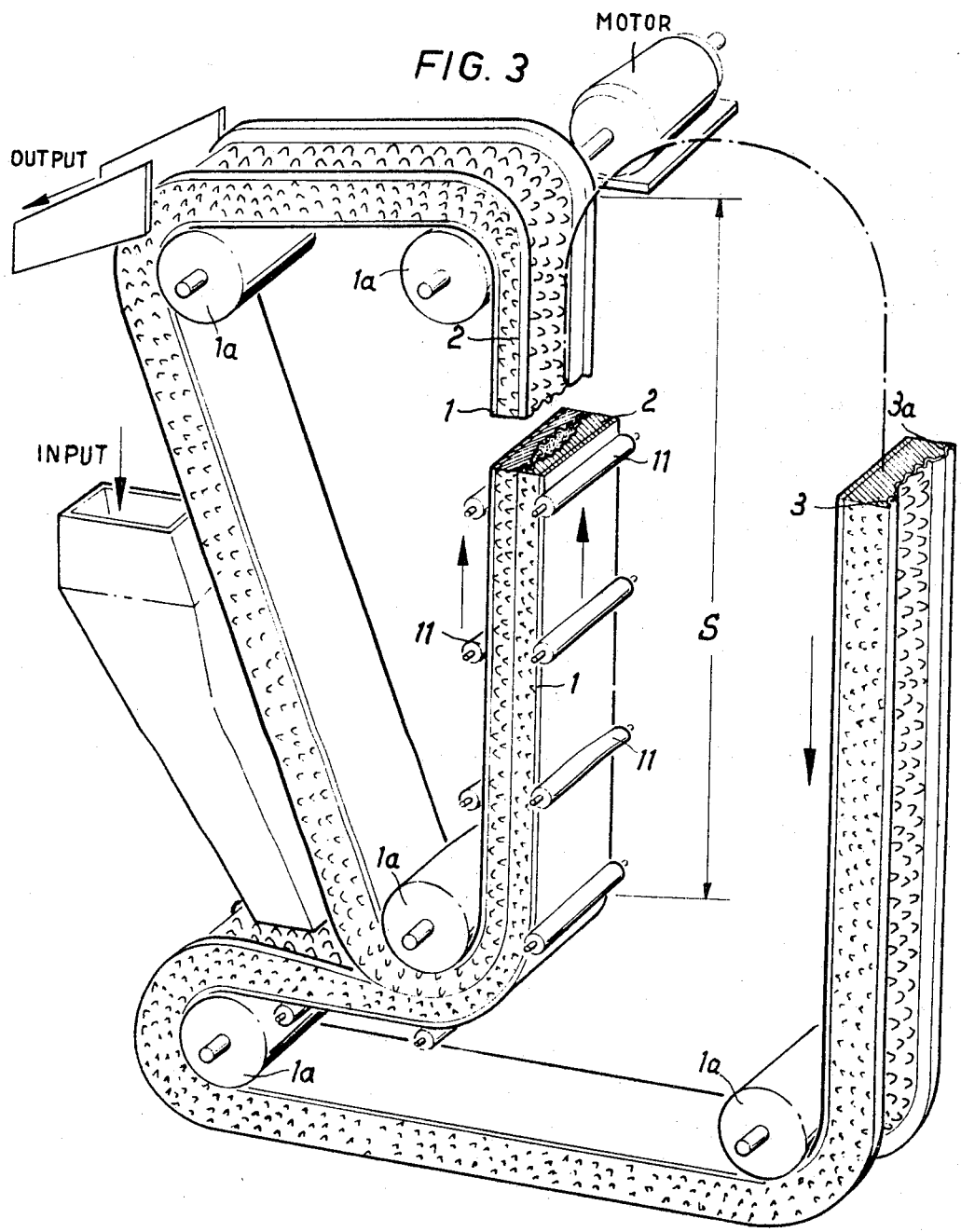

United States Patent Office 3,429,420
Patented Feb. 25, 1969

3,429,420
CONVEYOR INSTALLATION AND CONVEYOR BELT SYSTEM THEREFOR
Gert Bechtloff, Wilhelmshaven, and Reinhold Szonn, Lemforde, Germany, assignors to Lemforder Kunststoff G.m.b.H., & Co. K.G., Lemforde, Germany, and Beteiligungs- und Patent-verwaltungsgesellschaft mit beschrankter Haftung, Essen, Germany
Filed Mar. 28, 1967, Ser. No. 626,542
Claims priority, application Germany, Mar. 31, 1966, B 86,452
U.S. Cl. 198—165     6 Claims
Int. Cl. B65g 15/14, 19/18

ABSTRACT OF THE DISCLOSURE

The present invention concerns a conveyor installation with a steep conveying path and two endless conveyor belts having a conveying section thereof arranged in face-to-face relationship over said steep conveying path. Each of said belts comprises a first layer of strong load-supporting flexible material, a second layer of soft elastic foam material connected to said first layer while that surface of said second layer which faces away from said first layer is provided with elevations and depressions arranged in a waffle-like pattern. Each of said belts also comprises a third layer formed by a thin wear-resistant coat covering said elevations and depressions and following the contour of said elevations and depressions. Said second layer has its longitudinal marginal portions protrude in a direction away from said first layer beyond said waffle patterned surface when the belt is under no load.

---

Figure 1:
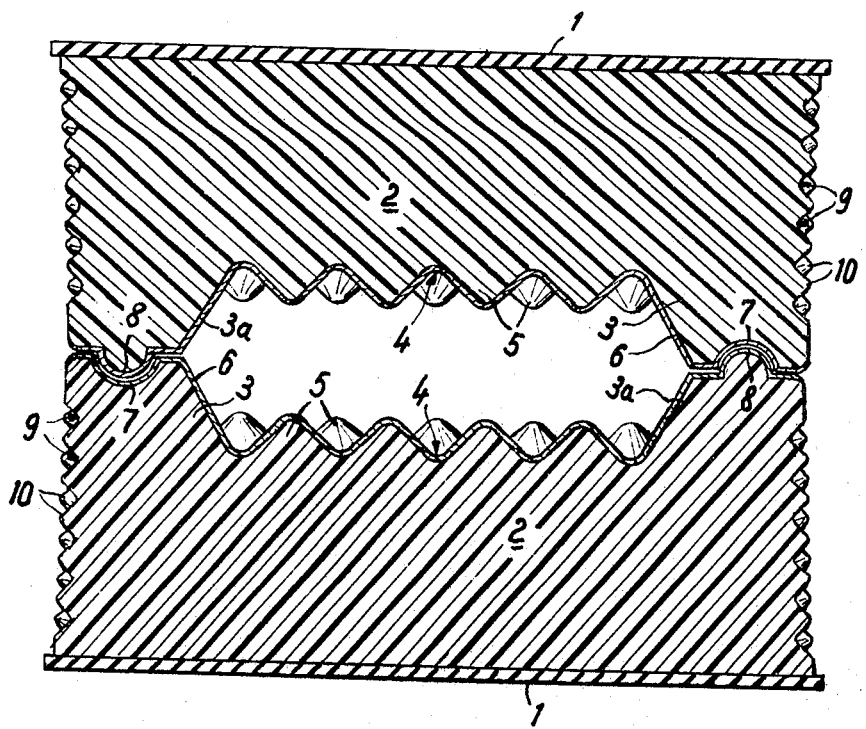

The present invention relates to a conveyor installation and a conveyor belt system therefor, and is especially directed to a steep conveyor in which two conveyor belts have two sides facing each other and provided with layers of foam material adapted to encase the material to be elevated therebetween, the said sides which face each other being provided with elevations and depressions in the manner of a waffle iron.

Installations of the above type have the drawback that the foam material for encasing the material is easily worn by the material being conveyed with the result that after a relatively short period of time it is necessary to exchange the layer of foam material.

In an endeavor to remedy the above mentioned drawbacks it has been suggested to provide such conveyor belts with wear-resistant layers. However, when applying thin wear-resistant layers to the plain foam material layers of conveyors of the above mentioned type, it has been found that in view of the considerable deformation of the layers of foam material, especially when the conveyor belts pass over deviating drums, the applied wear-resistant layers get detached from the foam material because the connecting surfaces between the wear-resistant layer and the adjacent layer of foam material are subjected to considerable stress.

It is, therefore, an object of the present invention to provide a conveyor installation and conveyor belt system therefor, which will overcome the above mentioned drawbacks.

It is another object of this invention to provide a conveyor installation and conveyor belt system therefor, of the above mentioned character, in which the rather sensitive foam material will be protected by a wear-resistant thin layer while the heretofore unavoidable detachment of said wear-resistant layer from the foam material caused by the considerable deformation of the foam material, especially when passing over deviating drums, will be avoided.

These and other objects and advantages of the invention will appear more clearly from the following specification in connection with the accompanying drawings, in which:

FIGURE 1 illustrates in cross section two interengaging belts for receiving the material to be conveyed.
FIGURE 2 is a top view of the inner surface of a belt portion employed according to the invention.
FIGURE 3 diagrammatically shows a conveyor installation with belts according to the present invention.
FIGURE 3a shows a detail of the installation shown in FIGURE 3.

A conveyor belt installation according to the present invention is characterized primarily in that upon the layer of foam material for instance, foam rubber, polyester, or polyether, a thin wear resistant layer is so applied that the depressions provided in the wear-resistant layer will be retained in the surface of the foam material. With a design of this type of the conveyor belts of a cover belt conveyor, the wear-resistant layer is able in view of its adaptation to the waffle-like depressions on the surface of the layer of the foam material, to adapt itself to the deformation to which the foam material is subjected when the latter is displaced by the material to be elevated. The wear-resistant layer is also able without difficulties to follow the strong deformations of the foam material when the conveyor belt passes over the deviating drums. This is due to the fact that in view of the yieldability of the elevations covered by the wear-resistant layer and located between the depressions, the wear-resistant layer will during the passing of the conveyor belt about the deviating drum not be expanded to any material extent.

In view of the stresses occurring during the passage of the conveyor belt over the deviating rollers, advantageously, also the end faces of the foam material layers are provided with depressions.

Referring now in detail to the drawings, the conveyor belt system shown therein comprises two belts adapted to face each other in close relationship to each other so as to receive the material to be conveyed therebetween. Each conveyor belt comprises a rubber belt or base 1 adapted to pass over deviating drums 1a, and furthermore comprises a layer 2 of foam material, for instance of polyester or polyether. The layer 2 is firmly connected to the belt or base 1, for instance by being vulcanized thereto.

The foam material layer 2 has that side thereof which faces away from the rubber base 1 provided with spaced marginal portions which, when the belt is under no load, protrude beyond the central portion between said marginal portions in a direction away from said base 1. In the steep conveyor section S in which the foam material layers 2 of the two conveyor belts moving upwardly at the same speed enclose therebetween the material to be elevated, the marginal portions 3, 3a of the foam material layer of each of the two conveyor belts are pressed against the marginal areas of the foam material layer of the respective other conveyor belt in such a way that the marginal areas 3, 3a will, due to the considerable yieldability of of the foam material, no longer protrude beyond the central sections of the foam material layers. As a result thereof, the material to be conveyed and enclosed between the two layers of foam material will, especially when pourable goods are involved, be prevented from laterally escaping between the foam material layers.

Within the range between the two marginal areas 3, 3a the foam material layer 2 is provided with depressions 4 and elevations 5 in the manner of a waffle iron. In the illustrated cross section and also in the longitudinal direction of the belt, the depressions 4 alternate with the pyramidal or approximately conical elevations 5. The foam material layer 2 has that side thereof which faces away from the belt or base 1 covered over its entire width or length with a layer 6 of wear-resistant material as, for instance, polyurethane. The coefficient of elasticity of this wear-resistant material is by a multiple higher than the coefficient of elasticity of the foam material employed for the layer 2. Thus, the layer 6 is considerably less elastic than the foam material. In spite of this fact, when the material to be conveyed between the layers of foam material of the two conveyor belts displaces the foam material, the layer 6 will be able to follow said foam material. In view of the fact that as a result of the displacement of the foam material the elevations 5 are pressed in and cause a reduction of the profile of layer 6 so that the available dimension of the layer 6 in its plane will suffice to absorb the bulging-in brought about by the material to be conveyed. The required adaptation of the layer 6 to the bulging-in or dents brought about by the material to be conveyed is obtained in transverse direction as well as longitudinal direction without material expansion of the layer 6.

Also, when the conveyor belt passes over the deviating drums, the layer 6 will, in spite of its lower expandability or stretchability be able in view of the depressions 4 to follow the deformations of the foam material. The said deformations of the foam material are due to the fact that on the outer circumference of the foam material layer, due to the larger diameter of the foam material with regard to the axis of rotation of the deviating drum, the foam material is expanded or stretched to a greater extent than is the case in the vicinity of the belt or base 1, the circulating path of which has a considerably shorter radius. Also, when passing over the deviating drums, the elevations 5 are pressed in to a considerable extent.

Similar conditions prevail with the layer 6 at the marginal areas 3, 3a of the foam material when the said marginal areas are pressed in within the steep conveying path, as well as when the conveyor belt passes around a deviating drum. The marginal strip or area 3 of one belt is provided with a groove 7 of semicircular cross section, whereas the marginal area 3a of the same belt has a bead with a corresponding semicircular profile. The marginal areas of the other belt are correspondingly provided with a bead and a groove for fitting in the first mentioned groove 7 and for receiving the first mentioned bead 8 respectively. The layer 6 also covers the outer surface of groove 7 and similarly covers the outer surface of bead 8. As will be seen from FIG. 3, along the steep conveyor path S the groove 7 of one belt is engaged by bead 8 of the other belt, while the bead 8 of said one belt engages the groove 7 of said other belt. In this way, the marginal areas of the foam rubber layers 2 are prevented from sliding off laterally.

The foam material layer 2 is also at the two end faces provided with recesses 9 and elevations 10 in the manner of a waffle iron. In this way, during the passage of the conveyor belt over a deviating drum, the necessary yieldability of the marginal areas of the foam material will be assured.

In view of its wear-resistance, the layer 6 well protects the layer 2 of foam material against wear by the material to be conveyed. The layer 6 is preferably applied by spraying, but can, of course, also be applied by casting or by painting. The layer 6 forms a skin having a thickness, for instance, of from 3 to 5 millimeters. With a medium thickness of foam material layer 2 of, for instance, 270 millimeters, the depressions 4 may have, for instance a depth of approximately 35 millimeters.

It is, of course, to be understood that the present invention is, by no means, limited to the particular construction and arrangement set forth above, but also comprises any modifications within the scope of the appended claims.

While passing through the steep conveying path S the back side of the belts 1, 2 is in engagement with rollers 11 by means of which the foam material layers 3, 4 are pressed against each other or against the bulk material therebetween.

What we claim is:

1. A conveyor installation with a steep conveying path, which includes: two endless conveyor belts having a conveying section thereof arranged in face-to-face relationship over said steep conveying path; each of said belts comprising a first layer of strong load-supporting flexible material, a second layer of soft elastic foam material connected to said first layer, that surface of said second layer which faces away from said first layer being provided with elevations and depressions arranged in a waffle-like pattern, each of said belts also comprising a third layer formed by a thin wear-resistant coat covering said elevations and depressions and following the contour of said elevations and depressions; the arrangement being such that said third layer of one belt faces said third layer of the other belt over said steep path; and means arranged adjacent said first layers of said belts over said steep path and operable to exert pressure against said first layers of said belts so as to press said belts against each other over said steep path.

2. An installation according to claim 1, in which also the lateral end faces of said second layer are provided with elevations and depressions.

3. An installation according to claim 1, in which said second layer has its longitudinal marginal portions protruding in a direction away from said first layer beyond said waffle patterned surface between said marginal portions when said belt is under no load, and said marginal portions which face each other are respectively provided with recesses and protrusions for interengagement with each other over said steep path.

4. A conveyor belt for use in connection with conveyor installations having a steep conveying path, which comprises a first layer of strong load-supporting flexible material, a second layer of soft elastic foam material connected to said first layer, that surface of said second layer which faces away from said first layer being provided with elevations and depressions arranged in a waffle-like pattern, and a third layer formed by a thin wear-resistant coat covering said elevations and depressions and following the contour of said elevations and depressions.

5. A conveyor belt according to claim 4, in which said second layer has its longitudinal marginal portions protrude in a direction away from said first layer beyond said waffle patterned surface when said belt is under no load, and that surface of one of said marginal portions which faces away from said first layer is provided with a depression whereas the corresponding surface of the other one of said marginal portions is provided with an elevation.

6. A conveyor belt according to claim 4, in which the material of said third layer is less elastic than the material of said second layer.

References Cited

UNITED STATES PATENTS

| 3,124,231 | 3/1964 | Ott | 198—165 |
| 3,319,776 | 5/1967 | Bechtloff | 198—165 |

RICHARD E. AEGERTER, *Primary Examiner.*